(12) United States Patent
Behrens

(10) Patent No.: US 6,601,340 B1
(45) Date of Patent: Aug. 5, 2003

(54) VEGETATION ELEMENT FOR GREENING ARTIFICIAL OR NATURAL SURFACES AND METHOD FOR PRODUCING SAME

(76) Inventor: Wolfgang Behrens, Trespenmoor 1, D-27243 Gross Ippener (DE)

( * ) Notice: Subject to any disclaimer, the term of this patent is extended or adjusted under 35 U.S.C. 154(b) by 0 days.

(21) Appl. No.: 09/869,571

(22) PCT Filed: Nov. 13, 1999

(86) PCT No.: PCT/DE99/03619
§ 371 (c)(1),
(2), (4) Date: Jun. 29, 2001

(87) PCT Pub. No.: WO00/40073
PCT Pub. Date: Jul. 13, 2000

(30) Foreign Application Priority Data

Dec. 31, 1998 (DE) .......................................... 198 60 914

(51) Int. Cl.⁷ .................................................. A01C 1/04
(52) U.S. Cl. ........................................................ 47/56
(58) Field of Search ................................ 47/58.1 R, 56, 47/58.1 SC, 1.01 F

(56) References Cited

U.S. PATENT DOCUMENTS

| | | | | |
|---|---|---|---|---|
| 2,158,952 | A | * 5/1939 | Timberlake | 47/58.1 R |
| 2,605,589 | A | * 8/1952 | Kuestner | 47/1.01 F |
| 3,710,510 | A | * 1/1973 | Tully et al. | 47/58.1 R |
| 4,023,506 | A | * 5/1977 | Robey | 47/58.1 R |
| 4,941,282 | A | * 7/1990 | Milstein | 47/58.1 R |
| 5,306,317 | A | * 4/1994 | Yoshizaki | 47/1.01 R |
| 5,397,368 | A | * 3/1995 | Molnar et al. | 47/1.01 F |
| 5,850,708 | A | * 12/1998 | Bergevin | 47/58.1 R |
| 6,035,577 | A | * 3/2000 | Motz et al. | 47/58.1 R |
| 6,250,010 | B1 | * 6/2001 | Behrens | 47/56 |
| 6,389,745 | B1 | * 5/2002 | Huh | 47/1.01 F |

FOREIGN PATENT DOCUMENTS

| | | | |
|---|---|---|---|
| DE | 1 126 663 | 3/1962 | |
| DE | 2 358 931 | 6/1974 | |
| DE | 4004284 | 8/1991 | |
| DE | 36 31 716 | 10/1993 | |
| DE | 42 30 312 | 3/1994 | |
| DE | 42 19 275 | 6/1994 | |
| DE | 195 23 406 | 12/1996 | |
| DE | 297 12 457 | 11/1997 | |
| EP | 0 383 109 | 8/1990 | |
| EP | 0 706 753 | 9/1995 | |
| JP | 9-143917 | * 6/1997 | |
| JP | 10136787 A | * 5/1998 | ............ A01G/7/00 |
| JP | 10215682 A | * 8/1998 | ............ A01G/1/12 |

* cited by examiner

Primary Examiner—Peter M Poon
Assistant Examiner—Jeffrey L. Gellner
(74) Attorney, Agent, or Firm—Collard & Roe, P.C.

(57) ABSTRACT

The invention relates to a vegetation element (10) for greening artificial or natural surfaces with dicotyledonous plants (18). The vegetation element consists of a support (14), soil improvement substrate (16) and dicotyledonous plants (18) and is configured such that it can be rolled up. According to the invention the vegetation element is characterized in that the support is a net (28), a woven or knitted fabric, a randomly bonded nonwoven or a fibre mixture which can be deposited on natural or artificially produced mineral soil (12). The soil (12) is prepared aseptically and the soil improvement substrate (16) is incorporated into an upper layer (24) of the soil (12) by compression or mixing, whereby the pH of the substrate (16) differs from the pH of the soil (12) and is adjusted to meet the physiological needs of the dicotyledonous plants (18). As a result a mixed layer (20) of soil (12) and substrate (16) is formed which has a line (22) separating it from the unmixed soil situated underneath. Germinable plant material of the dicotyledonous plants (18) is introduced into the mixed layer (20). As they form, the roots of the plants become anchored in the mixed layer (20) and the support (14). The above vegetation element (10) is further characterized in that it can be machine-stripped.

17 Claims, 1 Drawing Sheet

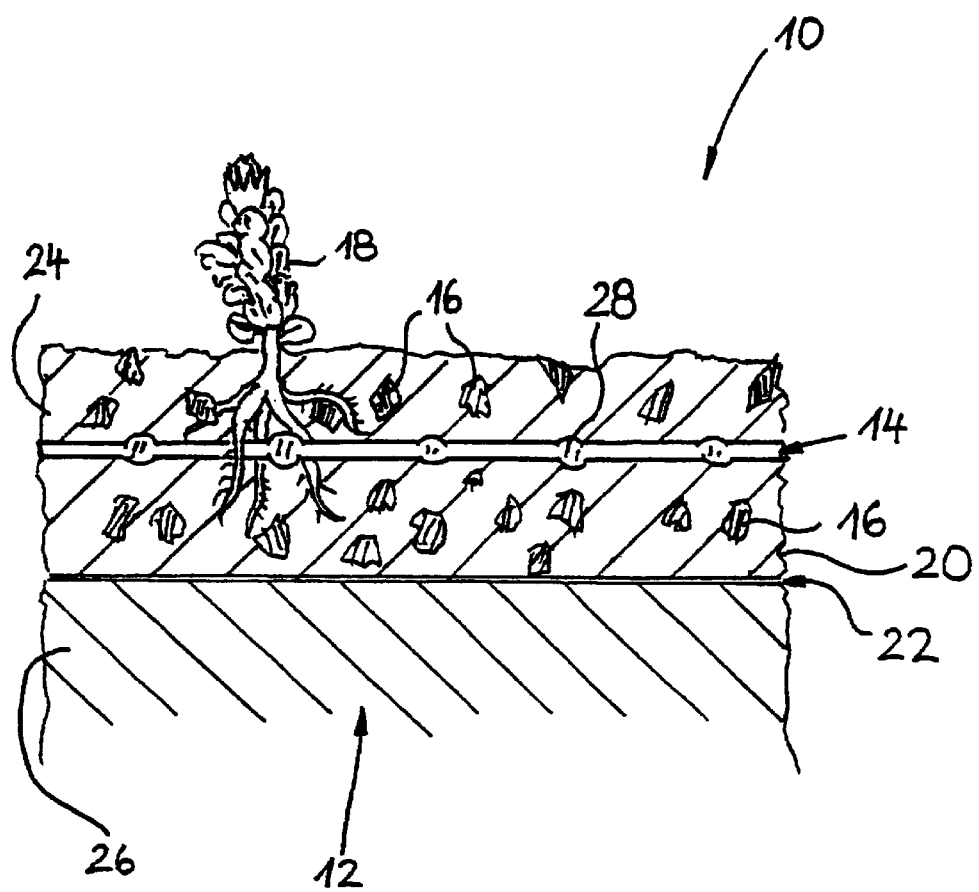

VEGETATION ELEMENT FOR GREENING ARTIFICIAL OR NATURAL SURFACES AND METHOD FOR PRODUCING SAME

CROSS REFERENCE TO RELATED APPLICATIONS

Applicants claim priority under 35 U.S.C. §119 of German Application No.198 60 914.0, filed: Dec. 31, 1998. Applicants also claim priority under 35 U.S.C. §120 of PCT/DE99/03619, filed: Nov. 13, 1999. The international application under PCT article 21(2) was not published in English.

This invention relates to a vegetation element for sodding artificial or natural surfaces with dicotyledonous plants and a method of producing same.

A variety of such vegetation elements are known, e.g., those described in German Patent 36 31 716 C2, German Patent 42 19 275 C2, European Patent Application 0 706 753 A1 and German Patent 195 23 406 C1; they are used in particular for extensive sodding of roofs and have proven largely successful. With these vegetation elements, a mat-shaped element which may be made of coconut fibers, mineral wool fibers, synthetic fibers or mats of these mixtures is precultivated either before application to the surface to be sodded and then is cultivated by gardening methods or it is provided with seeds, sprouts, spores or other plant material of germinable dicotyledonous plants only after application to the surface to be sodded. It is also known that mats into which a substrate as well as plant seeds and plant sprouts have been incorporated or where the sprouts are stitched onto the mat may be used, but in either case the mats are otherwise left to themselves, so to speak, when applied to the surface to be sodded.

In particular in the case of vegetation elements which are precultivated before being applied to the surface to be sodded, the cost is high because the support mats themselves are relatively expensive, and the gardening care is labor-intensive and is therefore also associated with a relatively high cost. In addition, there may be high disposal costs in the event the roof must be cleared.

There has thus long been a need to reduce the cost of such vegetation elements.

Therefore, the object of this invention is to create a vegetation element of the type described above so that it will be inexpensive, will require the least possible manual processing and will also be suitable for processing by machine.

This object is achieved with a vegetation element for sodding synthetic or natural surfaces with dicotyledonous plants, as set forth herein.

According to this invention, the support is provided in the form of a net, a woven or knit fabric or a fiber blend which can be applied to a naturally grown or synthetically produced mineral soil, said soil having been prepared to be sterile, and the soil improvement substrate is incorporated under pressure or by mixing into an upper layer of the soil, where the pH of the substrate does deviate or may deviate from the pH of the soil and is coordinated with the physiological needs of the dicotyledonous plants, so that the result is a mixed layer of soil and substrate having a dividing line with the unmixed soil beneath it, and germinable plant material of the dicotyledonous plants is introduced into the mixed layer, so that the developing roots become anchored in the mixed layer and on the support, and furthermore the vegetation element can be stripped off by machine.

To summarize, the object is achieved in a surprisingly simple manner by creating a vegetation element which is advantageously adapted to the morphological conditions of dicotyledonous plants of the known vegetation elements for sodding surfaces with monocotyledonous plants, i.e., ready-to-use grasses or roll-up lawns and to expand it in this way.

In the area of so-called roll-up lawns or ready-to-use grasses such as those known, for example, from German Patent Application 42 30 312 A1, Unexamined German Patent 23 58 931 and German Utility Model 297 12 457 U1, vegetation elements for extensive sodding are created which are extremely inexpensive and can be harvested by machine, i.e., stripped off and rolled up. Monocotyledonous plants, especially grasses, form a so-called root felt which makes it possible for the lawn to be stripped without requiring the use of an expensive fiber mat as a support material for the roll-up lawn. The root felt is so tight and dense that it alone guarantees sufficient stability of the roll-up lawn.

Due to the morphology, such ready-to-use grasses can be implemented only with monocotyledonous plants. Dicotyledonous plants, e.g., species of Sedum such as *Sedum acre, Sedum album, Sedum dasyphyllum, Sedum sexangulare, Sempervivum arachnoideum*, etc. do not form a dense root felt that would guarantee sufficient stability by itself. Therefore, relatively thick and especially expensive supports had to be used in the past to guarantee adequate cohesion of the plant cover and the vegetation element as a whole.

The accomplishment of the inventor can be seen in particular in the fact that he has developed a specific sequence of process steps for achieving a vegetation element which resembles a roll-up lawn in structure but is provided with dicotyledonous plants which are not actually suitable for such cultivation. This apparent paradox is solved in particular by a method according to the invention.

For differentiation from monocotyledonous plants (monocotyledons), in particular grasses, the term "dicotyledonous plants" as used below is understood to refer not only to true dicotyledons but also to spore-bearing plants such as moss, ferns, lycopodium and lichen.

Although these are not true dicotyledonous plants from a biological standpoint, from a technical standpoint they are characterized like dicotyledonous plants in that they do not form a dense root structure.

The inventor has recognized that it is possible to apply the technique used in the production of ready-to-use grasses to the field of artificial sodding with dicotyledonous plants, in particular the succulents (Sedum species), herbs, mosses, ferns, lichen and the like which have a weak root system, although this was previously considered to be impossible. The inventor has recognized in particular that it is important that the mineral soil (mother earth) on which the vegetation element is cultivated must be sterile. Otherwise, unwanted plant species already present in the soil would grow upward into the vegetation support and would thus destroy proper cultivation of the vegetation element. The term sterility as used here is understood to refer not only to disinfection of the soil, because this would only destroy pests such as nematodes in particular and microorganisms, but it is especially important to completely destroy all weed seeds, spores and unwanted plant parts such as plant parts of quick grass (*Agropyron repens*).

To be sure, the possibility of later unwanted secondary growth of grasses and sedges, especially due to airborne seeds, cannot always be ruled out. To this extent, it should be emphasized that after conclusion of the cultivation measures, the finished vegetation element may have less than 100% dicotyledonous plants. In the critical germination and sprouting phase, however, it is extremely important for the soil to be sterile, because grasses of dicotyledonous plants growing into the vegetation support would compete for the root space as well as the available supply of water and nutrients, which could thus destroy the cultivation measures.

In addition, it has also been found that introducing a soil improvement substrate or plant substrate which is formulated specifically for the physiological needs of the dicotyledonous plants is necessary, and the substrate must be introduced in such a way that the substrate penetrates no deeper than approximately 2 cm into the soil. Otherwise the pH of the outcropping soil—usually a field that is otherwise used agriculturally or a synthetically produced and backfilled soil—could be damaged in the long run to such an extent that the outcropping soil would be useless for further agricultural use. Furthermore, limited penetration of the substrate into the outcropping soil is important to create a more or less sharp dividing line between the mixed layer and the unmixed outcropping soil.

This separation line is needed to permit machine stripping of the vegetation element and to maintain the root depth so that as few roots as possible are cut when harvesting the vegetation element.

Furthermore, a limited depth of penetration of the substrate into the mixed layer in compression is important because otherwise the support would penetrate too deeply into the soil and then it could be damaged or even destroyed by the blades of the machines in the subsequent stripping operation.

Finally, the support which serves as an anchoring point for the roots of the dicotyledonous plants according to this invention is very important in the technical implementation of the "roll-up lawn" of dicotyledonous plants according to this invention. Use of supports made of a polypropylene mesh or nonwoven, for example, may be known in the state of the art, but the supports there are used exclusively for reinforcing the vegetation elements for installation on inclined surfaces where the support serves to accommodate any tensile forces that occur.

Practical experiments have shown that strip widths of 25 cm to 2.5 m and strip lengths of 50 cm to 35 m can be achieved with a vegetation element designed in this way.

In particular, machine stripability of such a vegetation element drastically reduces the cost of production of such a vegetation element. Manual cutting and rolling up, which was necessary in the past, was very labor-intensive and was therefore associated with a high cost. So far, the vegetation supports have been cultivated on a dividing film which separates the vegetation mat forming the vegetation support from the outcropping soil, so that the plants cannot send roots into the soil. However, such films can lead to a buildup of moisture which can damage or even destroy the vegetation. There have been attempts in the past to avoid this problem by cultivating corresponding vegetation supports with a maximum length of 15 meters on a gradient—created artificially if necessary.

This risk can be eliminated by the vegetation support according to this invention. Outcropping soil provides natural drainage which makes is possible to prevent a buildup of moisture. In addition, the cultivation may now take place over any desired area extent and without an inclined surface.

In advantageous embodiments of this invention, moss, ferns and/or monocotyledonous plants may be combined in with the dicotyledonous plants.

In practical embodiments of this invention, the mixed layer has a thickness of 1 cm to 3 cm, and furthermore the support is a mesh or the support is a woven fabric or a fiber blend. It is also possible here for the support to be made of plastic or a material that can decompose.

With regard to the soil improvement substrate, the substrate may be a mixture according to European Patent 0 383 109 B1 or German Patent 40 04 284 C1, or the substrate may be a substrate mixture available under the brand name BIO-STUCCO which is a trademark of Mr. Wolfgang Behrens. European Patent 0 383 109 B1 discloses the following materials which are suitable substrates:

(a) bark mulch.
(b) bark mulch+5 to 10% clay granulate.
(c) bark mulch+5 to 10% open-pored substance, preferably lava.
(d) bark mulch+5 to 10% clay granulate+5 to 10% lava. German Patent 40 04 284 C1 discloses a dry bio-mass consisting of seeds and/or plant parts and/or mosses as well as fertilizer and a dry adhesive that can be mixed with the bio-mass. This dry adhesive imparts a gluing effect in conjunction with water. The binding agent or vehicle is preferably a synthetic polyacrylamide compound in the form of granulate or powder that is capable of absorbing water in amounts multiple times its own weight. This dry bio-mass material is also a suitable substrate. In other practical embodiments of this invention, it is possible for the grain size fractions of the substrate to be in a range of 0.006 mm to 35 mm. In any case, the end substrate resulting from mixing the outcropping soil with the substrate should correspond to or at least approximate substrates according to the Guidelines for Planning, Execution and Care of Sodded Roofs of the FLL, 1995 edition, point 9 "Vegetation Support Layer."

Furthermore in additional practical embodiments of this invention, the soil may be a brown earth soil.

A method according to this invention for production of the vegetation element is characterized by the following process steps:

a) the outcropping soil is compressed,
b) the soil is prepared so it is sterile,
c) the support is applied to the soil,
d) the substrate is poured onto the support,
e) the substrate is worked through the support into the soil under pressure at least in part and then compressed,
f) plant material of germinable dicotyledonous plants is sown,
g) the vegetation element is cared for as a gardening element,
h) the vegetation element is stripped by machine.

Process step b in particular is of great importance. If the outcropping soil still contained microorganisms (diaspores), and in particular if it contained the seeds of monocotyledonous plants and/or unwanted dicotyledonous plants, these plants would grow upward and would destroy the efforts to create the vegetation element for dicotyledonous plants. Therefore, as the inventor has recognized, the soil must first be sterilized. According to a practical embodiment of this invention, the soil is sterilized with dazomet in granular form, a product available under the brand name BASAMID which is a trademark owned by BASF AG Corporation.

According to another embodiment of this method, the substrate is then worked into the soil to a depth of 1 to 2 cm and is compressed. This depth has proven appropriate because only penetration of the substrate into the soil to a depth of approximately 1 cm with subsequent compression guarantees that there will be a more or less sharp dividing line between the mixed layer and the outcropping soil beneath it and that the substrate cannot penetrate so deeply that the pH of the outcropping soil could be influenced in a negative sense.

An alternative method for production of a vegetation support is characterized by the following process steps:

a) the outcropping soil is compressed,
b) the soil is prepared to be sterile,
c) the substrate is poured onto the soil,
d) the substrate is incorporated into the soil and compressed,
e) the support is applied to the soil,
f) the germ-free plant material of the dicotyledonous plants is sown or dispersed,
g) the vegetation element is cared for as a gardening element,
h) the vegetation element is stripped by machine.

In refinements of this method, the support may be worked into the layer beneath it by mechanical means and/or the support may be defined by dispersing a layer of substrate.

This invention will now be described in greater detail on the basis of an embodiment of a vegetation element according to this invention as illustrated in the drawing.

The drawing shows a cross section of a detail of a vegetation element 10 according to this invention. Vegetation element 10 has a support 14 in the form of a polypropylene mesh 28 which has been applied to an outcropping of soil 12 with plants already growing in it.

Soil 12 may be a loamy, partially loamy, sandy, partially sandy, shaley or other soil which is adapted to the physiological requirements of the dicotyledonous plants 18 to be introduced into it by the incorporation of soil improvement substrate 16.

Support 14 which is designed as a polypropylene mesh 28 in this embodiment is applied only after the soil 12 has been sterilized, e.g., gassing with dazomet in granular form, a product available from BASF AG Corporation under the brand name BASAMID. After applying the polypropylene mesh 28 to an upper layer 24 of the soil 12, soil improvement substrate 16 is poured onto the support 14, compressed and incorporated into the top layer 24 of soil 12. In incorporation of the soil improvement substrate 16, the polypropylene mesh 28 is also pressed into the top layer 24 of the soil 12.

Incorporation of the substrate 16 results in formation of a mixed layer 20 of outcropping soil material and soil improvement substrate 16.

In the case of simultaneous compression and incorporation of substrate 16 into soil 12, a more or less sharp dividing line 26 is formed so that the finished vegetation element can be stripped along this line later and thus harvested.

The drawing illustrates a dicotyledonous plant 18 which is formed from germinable plant material introduced into the mixed layer 24. The roots of plant 18 are anchored through the mesh of polypropylene mesh 28 and through substrate 16. The drawing also shows that a layer of unmixed soil 26 remains beneath the dividing line 22. No substrate 16 which could have any negative influence on the pH of unmixed soil 26 has penetrated into this layer of unmixed soil 26.

What is claimed is:

1. A vegetation element for sodding artificial or natural surfaces with dicotyledonous plants that can be machine stripped and rolled up comprising:
   (a) a naturally formed or synthetically produced mineral soil which is compacted and sterilized;
   (b) a soil improvement substrate which is worked with pressure or by mixing into a top layer of the sterilized compacted soil, whereby the top layer forms a more highly compacted mixed layer comprising soil and substrate;
   (c) a support formed as a mesh, a woven fabric, a knit fabric, a nonwoven or a fiber blend and worked into the top layer together with the soil improvement substrate; and
   (d) germinable plant material of dicotyledonous plants, so that the roots forming when the dicotyledonous plants are germinating will be anchored in the mixed layer and on the support;
   wherein the pH of the soil improvement substrate deviates from the pH of the soil and is coordinated with the physiological needs of the dicotyledonous plants.

2. A vegetation element according to claim 1 wherein the substrate is a mixture including (a) seeds, plant parts or mosses, (b) fertilizer, and (c) a synthetic polyacrylamide binding agent.

3. A vegetation element according to claim 1 wherein the substrate is selected from the group consisting of (a) bark mulch, (b) bark mulch mixed with granulated clay, (c) bark mulch mixed with lava, and (d) bark mulch mixed with granulated clay and lava.

4. A vegetation element according to claim 1, wherein spore-forming plants such as moss and ferns are mixed with the plants.

5. A vegetation element according to claim 1, wherein lichen is mixed with the plants.

6. A vegetation element according to claim 1, wherein monocotyledonous plants are mixed with the plants.

7. A vegetation element according to claim 1, wherein the mixed layer is 1 to 3 cm thick.

8. A vegetation element according to claim 1, wherein the support is made of a decomposable material.

9. A vegetation element according to claim 1, wherein the support is made of plastic.

10. A vegetation element according to claim 1, wherein the particle size fractions of the substrate are in the range of 0.006 to 35 mm.

11. A vegetation element according to claim 1, wherein the soil is a brown earth soil.

12. A method of producing a vegetation element comprising the following steps:
    (a) compacting an outcropping soil;
    (b) sterilizing the soil;
    (c) applying a support to the soil;
    (d) spreading a substrate over the support and the soil;
    (e) working the substrate with the support into a top layer of the soil under pressure and compacting;
    (f) sowing in or spreading on germinable plant material of dicotyledonous plants to form a vegetation element;
    (g) cultivating the vegetation element horticulturally; and
    (h) machine stripping the vegetation element.

13. A method according to claim 12, wherein the soil is rendered sterile by using dazomet in granular form.

14. A method according to claim 12, wherein the substrate is incorporated in the soil to a depth of 1 to 2 cm and is compressed.

15. A method of producing a vegetation element comprising the following steps:
    (a) compacting an outcropping soil;
    (b) sterilizing the soil;
    (c) spreading a substrate on the soil;
    (d) working the substrate into a top layer of the soil and compacting;

(e) applying a support to the soil and working the support into the top layer of the soil;
(f) sowing in or spreading on germinable plant material of dicotyledonous plants to form a vegetation element;
(g) cultivating the vegetation element horticulturally; and
(h) machine stripping the vegetation element.

16. A method according to claim 15, wherein the support is mechanically incorporated into the layer underneath it.

17. A method according to claim 15, wherein the support is secured by scattering a layer of substrate.

* * * * *